H. W. THORNDIKE.
FLOOR CONNECTION.
APPLICATION FILED JAN. 8, 1912.

1,039,846.

Patented Oct. 1, 1912.

Witnesses:
John H. Parker
R. Wallace

Inventor:
Herbert W. Thorndike
by Macleod, Calver, Copeland & King
Attorneys.

UNITED STATES PATENT OFFICE.

HERBERT W. THORNDIKE, OF BOSTON, MASSACHUSETTS, ASSIGNOR TO F. W. WEBB MANUFACTURING COMPANY, OF BOSTON, MASSACHUSETTS, A CORPORATION OF NEW JERSEY.

FLOOR CONNECTION.

1,039,846.     Specification of Letters Patent.     Patented Oct. 1, 1912.

Application filed January 8, 1912. Serial No. 669,966.

*To all whom it may concern:*

Be it known that I, HERBERT W. THORNDIKE, a citizen of the United States, residing at Boston, in the county of Suffolk, State of Massachusetts, have invented a certain new and useful Improvement in Floor Connections, of which the following is a specification, reference being had therein to the accompanying drawings.

In my application for United States Letters Patent Serial No. 635,419 filed June 26, 1911, I have shown and described a floor connection for use to connect a water closet or similar fixture to the soil pipe. This connection is so constructed that if the joint leaks, water will escape from the joint and the presence of the water will indicate that the joint is defective. I find in practice that the hole for the soil pipe is frequently irregular in shape, or that the base of the fixture makes a tight joint with the floor being sometimes pointed, so that the water which leaks from the joint does not run out onto the floor by flowing under the base of the closet but escapes through the soil pipe hole onto the ceiling below or follows down the soil pipe and is not noticeable.

My present invention has for its object to provide means to insure that any water leaking from the joint between the fixture and the soil pipe shall flow out onto the floor upon which the closet is placed, and not escape through the hole through which the soil pipe passes or follow down the outside of the soil pipe. By this construction a reliable warning of the defectiveness of the joint is provided and all possibility of damage to the ceiling of the room below is done away with.

The invention will be understood from the following description taken in connection with the accompanying drawings and the novel features thereof will be pointed out and clearly defined in the claims at the close of this specification.

Figure 1:
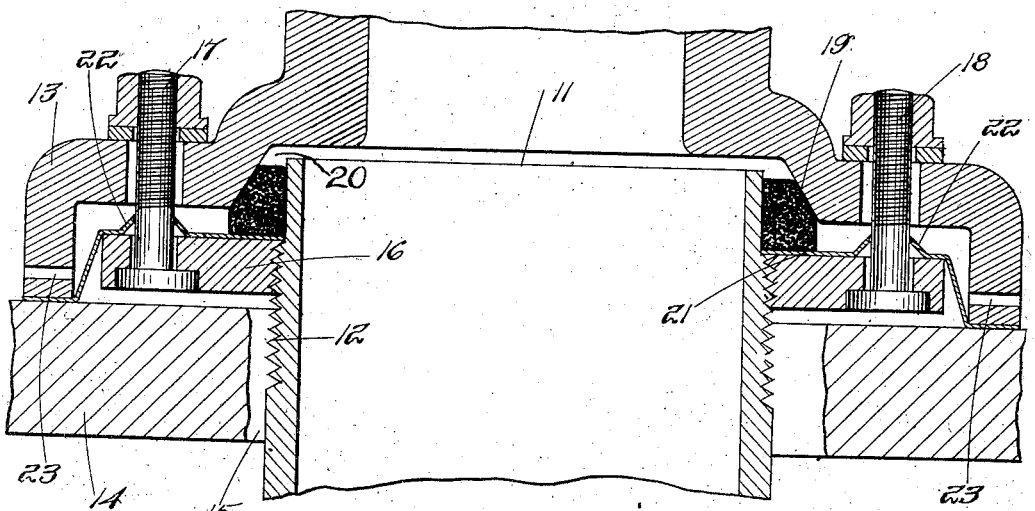
Figure 2:
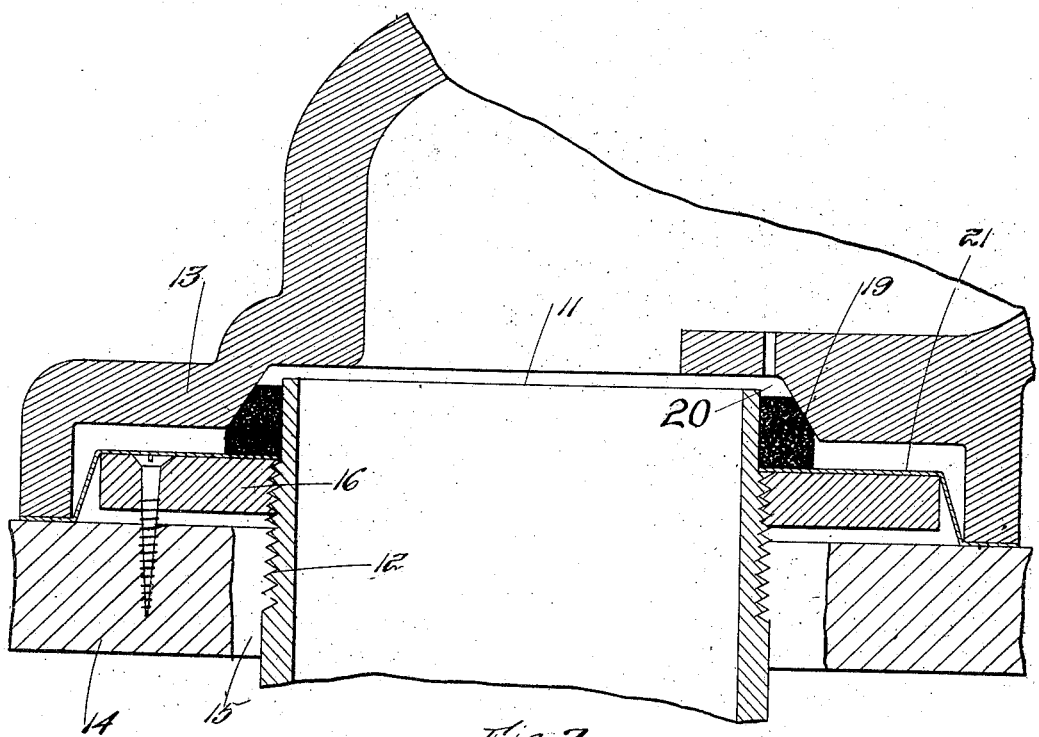

In the drawings, Figure 1 is a section of a floor connection embodying my invention. Fig. 2 is a section taken at right angles to the section shown in Fig. 1.

Referring to the drawings, at 11 is indicated the upper end of the soil or drain pipe being screw threaded as shown at 12. The base of the fixture is shown at 13, and the floor upon which it rests is shown at 14. At 15 is shown the hole through the floor. This hole is often irregular in shape and frequently the soil pipe is not located centrally of the hole. On the pipe 11 is screwed a collar 16 to which the base of the closet is secured by bolts 17 and 18, there being a compressible gasket 19 located in the space between the end of the pipe, the collar and the base of the fixture. In putting the parts in place, the collar is adjusted to such a height that when the bolts 17 and 18 are tightened the fixture is held firmly down to the floor and the gasket is compressed and forms a tight joint between the pipe and the fixture. A small space 20 is left above the gasket 19 to receive water from the closet so that in case the joint between the pipe and the fixture is defective, leakage of water from this space will warn of the defectiveness of the joint. By applying black lead to the screw threads of the soil pipe all possibility of water escaping along the threads of the pipe is effectually prevented. The parts thus far described are the same as are shown and described in my prior application hereinabove referred to.

Over the screw-threaded collar 16 and before the gasket 19 is put in place I place a flexible metal shield 21 which extends from the edge of the soil pipe out over the collar downwardly to the floor and then under the base of the fixture all as will be plainly seen in the drawings. This shield is preferably made from soft ductile metal, such for instance as soft copper, or other suitable waterproof material so that it may be readily shaped between proper dies. As the shield is interposed between the collar and the gasket the pressure to which the gasket is subjected wedges the gasket into the angle between the shield and the pipe and insures a tight joint at this point. At the proper points are located holes to allow the bolts 17 and 18 to pass. These holes are surrounded by an upwardly bent circular portion 22, see Fig. 1, raised above the general level of this portion of the shield sufficiently so that any water leaking through the joint cannot escape through the bolt holes in the shield. As the shield is made of thin ductile material it is found that it readily adjusts itself to any slight variation in the height of the collar 16 being bent upward if the collar is above normal height, or by being bent downward if the collar is below this position. The inclined or sloping portion between the edge of the collar and the inside edge of the base of the fixture also bends and makes it possible for the shield to adjust itself to the position of the parts. In the bottom of the base of the closet I place one or more holes 23 at a position about one-fourth of an inch above the floor.

In case the joint is defective which may result from a variety of causes water from the space above the gasket 19 leaks down past the gasket onto the shield 21. The shield prevents water flowing through the hole in the floor through which the soil pipe passes and if the crevice between the base of the closet and the floor has been pointed the water is contained within the space under the base of the closet until it has reached a level high enough to flow out through the holes 23. In case the joint under the base of the closet has not been pointed the water can flow out onto the floor through this crack. In either case however the water must flow out onto the floor upon which the closet is set up so that notice is thereby necessarily given in case the joint becomes defective. All danger of injury to the ceiling of the room below is also obviated as there is no possibility of the water escaping through the soil pipe hole or following down the soil pipe.

What I claim is;

1. The improved floor connection comprising the soil pipe, a collar on the soil pipe, a fixture, a gasket between the soil pipe and the collar and the base of the fixture, and a shield extending from the edge of the soil pipe over the collar and under the edge of the base of the fixture.

2. The combination with a fixture of a soil pipe, a collar thereon, a shield extending from the soil pipe over the collar, and under the edge of the base of the fixture, and a gasket interposed between the pipe and the base of the fixture contacting with the said shield.

3. In combination with a recessed fixture, a screw threaded drain pipe extending upwardly in the recess in the fixture, a collar on the screw threaded portion of the drain pipe, a shield over said collar and extending under the fixture, a gasket between the drain pipe and the fixture and resting on the shield, means for drawing the fixture down onto the gasket to compress the same into the space between the pipe and the fixture.

4. The combination with a fixture having a recessed base of a drain pipe, a collar thereon, a shield extending from the edge of the drain pipe over the collar and under the edge of the base of the fixture, said fixture having a hole therein to permit the escape of water accumulating under the recessed fixture.

In testimony whereof I affix my signature, in presence of two witnesses.

HERBERT W. THORNDIKE.

Witnesses:
N. K. THORNDIKE,
LUCY J. KNIGHT.